Figure 1:
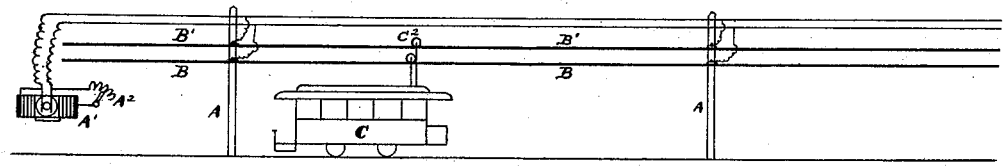

(No Model.)  R. M. HUNTER.  2 Sheets—Sheet 1.
ELECTRIC RAILWAY.

No. 437,158.  Patented Sept. 23, 1890.

Attest:
Henry Drury
E. M. Brackinreed

Inventor:
R. M. Hunter (No Model.) 2 Sheets—Sheet 2.

R. M. HUNTER.
ELECTRIC RAILWAY.

No. 437,158. Patented Sept. 23, 1890.

Witnesses: Inventor:

UNITED STATES PATENT OFFICE.

RUDOLPH M. HUNTER, OF PHILADELPHIA, PENNSYLVANIA, ASSIGNOR TO THE ELECTRIC CAR COMPANY OF AMERICA, OF SAME PLACE.

ELECTRIC RAILWAY.

SPECIFICATION forming part of Letters Patent No. 437,158, dated September 23, 1890.

Original application filed September 23, 1886, Serial No. 214,309. Divided and application filed June 1, 1887, Serial No. 239,930. Again divided and this application filed March 24, 1888. Serial No. 268,360. (No model.)

*To all whom it may concern:*

Be it known that I, RUDOLPH M. HUNTER, of the city and county of Philadelphia, and State of Pennsylvania, have invented an Improvement in Electric Railways, of which the following is a specification.

My invention has reference to electric railways; and it consists in certain improvements, all of which are fully set forth in the following specification, and shown in the accompanying drawings, which form part thereof.

This is a division of my application, Serial No. 239,930, filed June 1, 1887, which was a division of my earlier application, Serial No. 214,309, filed September 23, 1886.

This invention has particular reference to the vehicle and motor connections, both mechanical and electrical.

Referring now to the vehicle more specifically, my object has been to make a substantial and practical connection between the motor and vehicle-axles, and to do this I have suspended a motor-frame from the car-axles and arranged two motors thereon with a common armature or motor shaft set preferably on an incline and having on one or both of its ends a worm which meshes with worm-wheels on the vehicle-axles. If desired, this worm may be arranged on the motor-shaft to have longitudinal motion (but not independent rotary motion) against the action of a spring for the purpose of facilitating starting when the inertia of the stationary car is to be overcome. In this case the first tendency of the motor is to cause the worm to work upon the worm-wheel as if it were a nut and gradually compress a spring, so that its work gradually increases until the car begins to move. Then the spring will be fully compressed and will tend to expand itself and always cause the motor to be connected with the vehicle-axle with an elastic connection, which will greatly facilitate and improve the running of the motor. Of course there may be two of these movable worms. It is not necessary to my invention, broadly considered, that the worms shall be longitudinally movable on the motor-shaft, and if desired one motor only need be used and that may be geared to only one axle. The car may have a secondary battery, which may be employed to regulate the motor or even supply it with electric current and may also be used to light the car. The same current which supplies motive power to the electric motor also charges the secondary battery, and said battery may be coupled up with the motor in series or multiple-arc connection, and in such connection may also be used to regulate the power of the motor as set forth in my application, Serial No. 208,418, filed July 19, 1886. The strength of the battery is regulated in the well-known manner of coupling up the cells of batteries, and the battery may be provided with a detecting-signal to indicate when fully charged. If desired, this secondary battery may also be used to energize the motor.

Another part of my improvement has reference to the detection of leaks in the working-conductors. It is a difficult matter to prevent leakage of the current when using bared working-conductors, such as must be used in electric railways of this class, and this danger is greatest in underground conductors. This leakage is far less objectionable in systems using separate working and supply conductors than in systems using simply the working-conductors. In carrying out this portion of my invention I provide a shunt-circuit around the motor, connecting, preferably, with the two collectors, and in this shunt-circuit I place a resistance-changer and an electro-magnet whose armature controls an alarm-circuit, causing the alarm to ring only when the armature is not attracted by its magnet. The operation is that when the motor is normally running the resistance in the shunt should be so adjusted that the armature of the magnet contained therein is attracted and the alarm-circuit broken. If, now, the motor should run onto a section or portion of the working-conductor where the current was much diminished by loss, the resistance in the shunt would be far too great for the reduced current and the armature would fall, causing the alarm to ring and thereby call attention to the location of the leak and enable the same to be immediately attended to. External disturbances in the current, as trouble at the central station or change in the resistance of the motor-circuit, might cause the alarm to ring; but these would be exceptional causes and could be accounted for. A detector to indicate automatically the position of a leak is very important, particularly on long lines traversing uninhabited districts, as well as those of a damp nature.

The foregoing are the essential features of the improvements, and will be described hereinafter in detail.

Figure 2:
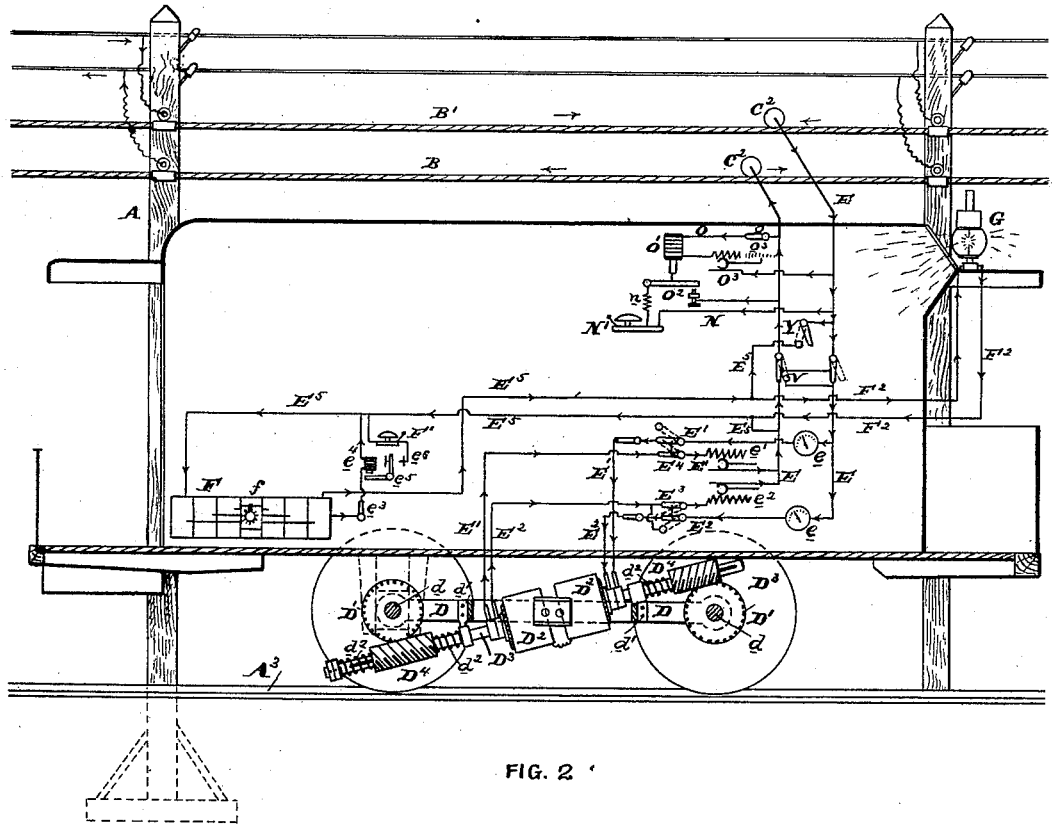
Figure 3:
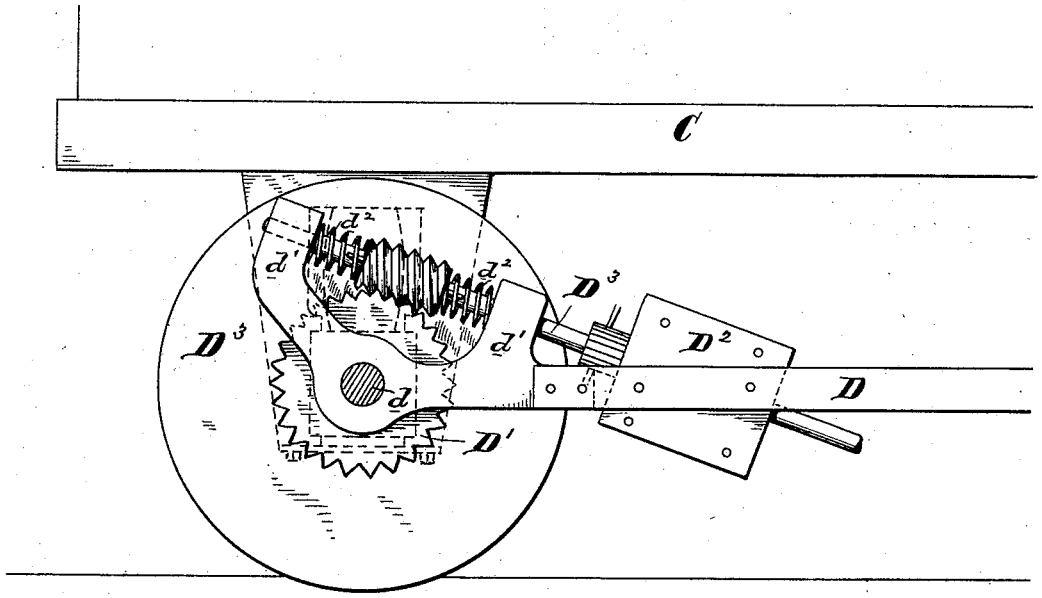

In the drawings, Figure 1 is an elevation of an electric railway embodying my improvements. Fig. 2 is a sectional elevation of a portion of same, showing the details of the car and its connection with the working-conductors. Fig. 3 is a sectional elevation of a modified connection of motor with axles.

B B' are the working-conductors arranged parallel to the track, and may be in sections or continuous and supported in any way desired—overhead or underground or on the surface.

$A^3$ are the rails of the railway, upon which the electrically-propelled vehicle runs, and are arranged parallel to the working-conductors. The car or vehicle is provided with suitable collectors $C^2$, of any desired construction, moving in contact with the line or working conductors B B'.

Referring now to the construction of the passenger electric car or vehicle shown in Fig. 2, D is a motor-frame preferably supported upon the car-axles $d$ or their boxes, the car-body being in most cases supported on springs. To this frame D one or more electric motors $D^2$ are secured, all preferably having the same shaft or armature-shaft, which is also preferably set on an incline. Carried upon the ends of this shaft are the worms $D^4$, which mesh with worm-wheels D' on the axles $d$ of the car, one of these worms being above one worm-wheel and the other below the other worm-wheel. The obliquity of the armature or motor shaft is not necessary, though desirable. To enable the motor to start up without having to overcome the full resistance due to the inertia of the stationary car, I make the worms longitudinally movable upon the motor-shaft $D^3$ and provide springs $d^2$ upon each end and surrounding the shaft, though this particular arrangement of the springs is immaterial. It will be seen that upon starting the rotation of the motor-shaft the first impulse of the worms should be to screw on or over the stationary worm-wheel, compressing the springs, and thus gradually increasing the resistance to the revolution of the motor-shaft. This enables the motor to exert far greater power at starting, requiring a much smaller motor to overcome the inertia of the car than would be required if the worms were fast upon the motor-shaft. It is evident that the worm should be sufficiently long to allow of this travel over the worm-wheel without running off the same. It is not necessary to have the worms work against springs on both ends if there be two worms, for, if a single spring is on opposite ends of these two worms, then either one or the other of said springs would take the thrust in starting the motor forward or backward. This last construction would be as if I removed the spring $d^2$ on the left hand of the motor-shaft in Fig. 2.

Referring again to Fig. 2, E is the motor-circuit-supplying current from the collectors to the motors. To enable the proper governing of all the motors most perfectly, I connect all of the armatures of the different motors, be they on one car or one train in one circuit $E^2$ and all of the field-magnets in another circuit E', each provided with a current-indicator $e$. The armature-circuit $E^2$ has a resistance-changer $e^2$ and current-reverser $E^3$, while the field-magnet circuit E' has its own resistance-changer $e'$ and current-reverser $E^4$. By this means the armature-circuit may be regulated, cut out, or have its current reversed without affecting the field, and vice versa.

The construction of the motors shown in Fig. 2 is similar to that set out in my application, Serial No. 200,400, filed April 26, 1886, in which the armature is stationary and the field-magnets revolve. The directions of the currents are indicated by the arrows. Any type of electric motor may be used.

In Fig. 3 is shown a modified construction of what is shown in Fig. 2 so far as the motor-connection with the axle is concerned. The same or corresponding parts in the two figures are lettered alike. In this case the end of the armature-shaft is supported to the axle as well as its middle part or that between the motor and worm. Any suitable frame may be employed for positively holding the motor-shaft to the axle, so as to keep the worm and worm-wheel in gear. In this case the motor is shown with stationary field-magnets and a revolving armature fixed on the worm-shaft.

O, Fig. 2, is a shunt-circuit around the motor, and is provided with a resistance-changer $O^3$ and includes an electro-magnet O'. The resistance-changer $O^3$ may have an indicator $o^3$ to indicate the amount of resistance in this circuit. This circuit, which I will call a "detector-circuit," may be cut out by a switch $o$. The magnet O operates an armature $O^2$, which is, in effect, a circuit-breaker arranged in an alarm-circuit N, including an alarm-bell N', and if derived from the motor-circuit a resistance $n$ is provided to prevent an excess of current passing through and destroying the alarm-bell magnets. This device is to detect a leak in the working-conductors due to grounding, and is particularly adapted to sectional working-conductors. The resistance $O^3$ is increased so that the magnet O' will just hold up its armature under the normal current. If, now, the motor run upon a section where the line-current is weak, owing to leakage or other defect like shortcircuiting, the armature will fall and sound an alarm, indicating the position of the leak or defect. This armature might drop at other times when varying the resistance of the motor-circuit; but such causes would be readily understood and no notice need be taken of them. It would be an easy matter to provide an automatic device to prevent the alarm sounding upon cutting the motor out of circuit.

F, Fig. 2, is a secondary battery of a series of cells, which may be coupled up in any desired manner in series or multiple (well known in medical and surgical batteries) to vary the power of said battery. This battery is charged by adjusting the switches Y so that the line-current passes partly over the circuit $E^5$, charging the battery, the current from which battery may be caused to pass over a lighting-circuit $F^2$ and light the electric lamp G of the arc or incandescent type at night. As shown, the secondary battery is cut out of the line-circuit and is only operating the lighting-circuits. When the switch Y is closed, the battery is being charged and is coupled in multiple-arc connection with the motors. To couple up the battery in series with the motor, it is simply necessary to shift the switches V in the motor-circuit to the position indicated in dotted lines. The line-current would then pass through switch Y, circuit $E^5$, secondary battery, circuit $E^5$ again to motor-circuit E below the switch V, then through the motors, and back to the outgoing line through switch V. By this arrangement of secondary battery and its circuits the motors could be operated by the current so produced, and the line-current could be augmented when required by said secondary-battery current.

The general arrangement and operation of a secondary battery on an electrically-propelled vehicle such as herein set forth is fully set out and claimed in another application of mine, Serial No. 208,418, filed July 19, 1886. In that application the principle of regulating the power of the motors by the reverse current of the secondary battery is fully elucidated.

The secondary battery may have an alarm-circuit $e^3$, containing a magnet $e^4$ of high resistance, which when the battery is fully charged operates an armature $e^5$ and closes a local signal-circuit $e^6$, including a signal-bell F'. When the signal is sounded, the switch Y may be opened, and the battery will be cut out in its charged condition.

In conclusion, I would state that I do not limit myself to the details of construction, as they may be modified in various ways without departing from my invention.

Any matters set out in this application and not claimed are not dedicated to the public, but form subject-matter of other applications—that is to say, the means for regulating the speed of the motor, the elastic connection between the motor and axle, the obliquity of the motor-shaft, and the connection of a longitudinal motor-shaft gearing with the two axles by worm and worm-wheels are not herein claimed, broadly, as they form subject-matter of my applications, Serial No. 214,309, of 1886; Serial No. 239,930, of 1887; Serial No. 264,456, of 1888; Serial No. 217,346, of 1886; Serial No. 256,604, of 1887, and Serial No. 271,141, of 1888.

Having now described my invention, what I claim as new, and desire to secure by Letters Patent, is—

1. In an electrically-propelled vehicle, the combination of an axle, a worm-wheel secured thereon, a rotary shaft arranged longitudinally upon the vehicle, a worm on said shaft meshing with the worm-wheel, an electric-motor armature secured to and concentric with said shaft, a commutator for the armature, a bearing for the shaft journaled on the axle, and stationary magnets inclosing said armature carried by the vehicle and under the body thereof.

2. In an electrically-propelled vehicle, the combination of the axle having a worm-wheel arranged thereon with an electric motor carried by said vehicle and having its shaft arranged longitudinally on said vehicle, a worm longitudinally movable on said motor-shaft meshing with the worm-wheel, and a spring against which said worm bears to give it an elastic connection with its shaft, substantially as and for the purpose specified.

3. In an electrically-propelled vehicle, the combination of the axle having a worm-wheel, an electric motor carried by said vehicle, a worm longitudinally movable on said motor-shaft but rotating therewith, and a spring arranged upon each end of the worm and against which it bears to give the motor an elastic connection with respect to the axle.

4. In an electrically-propelled vehicle, the axles and wheels supporting a car-body, a worm-wheel on one of said axles, an electric motor having a shaft longitudinally arranged under the car-body, a worm on the shaft meshing with the worm-wheel, and a frame journaled on the axle forming a journal or bearing for the motor-shaft and a support for the motor.

5. In an electrically-propelled vehicle, the combination of the two axles with a worm-wheel on each axle, an electric motor having its shaft extending from axle to axle, a worm on each end meshing with the worm-wheels to drive both axles simultaneously, and elastic connections between said motor-shaft and worms.

6. The combination of a vehicle having a worm-wheel on its axle, with two motors having a common shaft, and a worm carried by said shaft and adapted to work with the worm-wheel.

7. The combination of a vehicle having a worm-wheel on its axle, with two motors having a common shaft and a worm carried by said shaft and adapted to work with the worm-wheel, and two independent electric circuits, one of which includes both of the armatures and the other of which includes both the field-magnets of said motors.

8. In an electrically-propelled car, the combination of two axles and their wheels, a car-body resting upon said axles through the mediation of springs, a worm-wheel upon each of said axles, worms meshing with said worm-wheels, a longitudinal motor-shaft common to both of said worms, an electric motor directly connecting with and rotating said shaft, and a frame independent of the car-body supported upon said axles and constructed as a support for the motor and with bearings or journals near each axle for the shaft, whereby the motor-shaft is maintained in line with the worm-wheels to keep both worms in gear with their worm-wheels.

9. In an electrically-propelled car, the combination of two axles and their wheels, a car-body resting upon said axles through the mediation of springs, a worm-wheel upon each of said axles, worms meshing with said worm-wheels, a longitudinal motor-shaft common to both of said worms, an electric moter directly connected with and rotating said shaft and arranged between the worm-wheels, axles, and shaft-bearings, and a frame independent of the car-body supported upon said axles and constructed as a support for the motor and with bearings or journals near each axle for the shaft, whereby the motor-shaft is maintained in line with the worm-wheels to keep both worms in gear with their worm-wheels.

10. In an electric car, the combination of an axle and wheels, a car-body supported on the axle by springs, an electric motor journaled upon the axle, a worm-wheel on the axle, a worm on the shaft meshing with the worm-wheel, and a bearing or journal for the motor-shaft secured to the motor and axle, whereby the motor, journal, and axle have a permanently-fixed relation for various movements of the axle and car-body.

11. In an electric car, the combination of an axle and wheel, a car-body supported on the axle by springs, an electric motor journaled upon the axle, a worm-wheel on the axle, a worm on the shaft meshing with the worm-wheel, a bearing or journal for the motor-shaft secured to the motor and axle, whereby the motor, journal, and axle have a permanently-fixed relation for various movements of the axle and car-body, a source of electric energy, circuits connecting the source of energy with the electric motor, and means for regulating the speed of the motor arranged upon the car-body and independent of the motor.

In testimony of which invention I hereunto set my hand.

RUDOLPH M. HUNTER.

Witnesses:
  E. M. BRECKENREID,
  HENRY DRURY.